United States Patent
Takago et al.

Patent Number: 5,117,025
Date of Patent: May 26, 1992

[54] POLYSILETHYLENESILOXANE

[75] Inventors: Toshio Takago; Hirofumi Kishita; Hitoshi Kinami; Kenichi Fukuda; Shinich Sato, all of Annaka; Koichi Yamaguchi; Shuji Suganuma, both of Takasaki, all of Japan

[73] Assignee: Shin-Etsu Chemical Co., Ltd., Tokyo, Japan

[21] Appl. No.: 726,334

[22] Filed: Jul. 5, 1991

[30] Foreign Application Priority Data

Jul. 6, 1990 [JP] Japan ................... 2-178728
Jul. 6, 1990 [JP] Japan ................... 2-178730
Jul. 6, 1990 [JP] Japan ................... 2-178732

[51] Int. Cl.$^5$ ................................. C07F 7/08
[52] U.S. Cl. ....................................... 556/434
[58] Field of Search ............................. 56/434

[56] References Cited

U.S. PATENT DOCUMENTS 2,562,000 7/1951 Sveda ................... 556/434 X
2,732,390 1/1956 Clark ..................... 556/434

FOREIGN PATENT DOCUMENTS 45-27718 9/1970 Japan ..................... 556/434
0773175 4/1957 United Kingdom ........ 556/434

Primary Examiner—Paul F. Shaver
Attorney, Agent, or Firm—Oblon, Spivak, McClelland, Maier & Neustadt

[57] ABSTRACT

The present polysilethylenesiloxane is a liquid polymer represented by the following general formula:

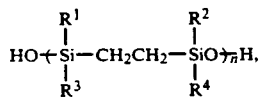

wherein $R^1$ and $R^2$ each represent a lower alkyl group and $R^3$ and $R^4$ each represent a perfluoroalkylethyl group, and n is an integer of 10 to 1,000. This polymer is quite useful as a major component of elastomer compositions having chemical resistance, electrical properties, and high strength.

6 Claims, 8 Drawing Sheets

POLYSILETHYLENESILOXANE

BACKGROUND OF THE INVENTION

1. Field of the Invention

The present invention relates to a novel polysilethylenesiloxane.

2. Description of the Prior Art

Dimethylpolysiloxanes are excellent in heat resistance, cold resistance, and weather resistance and also excellent in properties such as elastomeric properties, release properties, and electrical properties and are used in wide fields as a major component, for example, in various rubber materials and coating materials for building materials, transport equipment, household electrical appliances, business and office machines, etc. These properties of dimethylpolysiloxanes are ascribed to the facts that the bond energy of the siloxane linkage constituting the backbone chain is high, the siloxane linkage is ionic, and the intermolecular cohesive force of the siloxane molecule is small.

However, dimethylpolysiloxanes have such defects as that the backbone chain is liable to be cleaved by an ionic agent such acids and alkalis and the mechanical strength properties are not satisfactory.

SUMMARY OF THE INVENTION

Therefore, an object of the present invention is to provide a novel polysiloxane compound which obviates the above defects possessed by dimethylpolysiloxanes.

The present polysilethylenesiloxane is represented by the following general formula [I]:

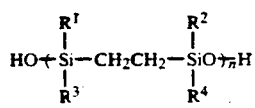

wherein $R^1$ and $R^2$, which may be the same or different, each represent a hydrocarbon group having 1 to 10 carbon atoms, $R^3$ and $R^4$, which may be the same or different, each represent a hydrocarbon group having 1 to 10 carbon atoms or a perfluoroalkylethyl group, and n is an integer of 10 to 1,000.

That is, by introducing silethylene linkages in the siloxane backbone chain, the present invention has succeeded in obviating the above defects possessed by dimethylpolysiloxanes.

DETAILED DESCRIPTION OF THE INVENTION

Figure 1:
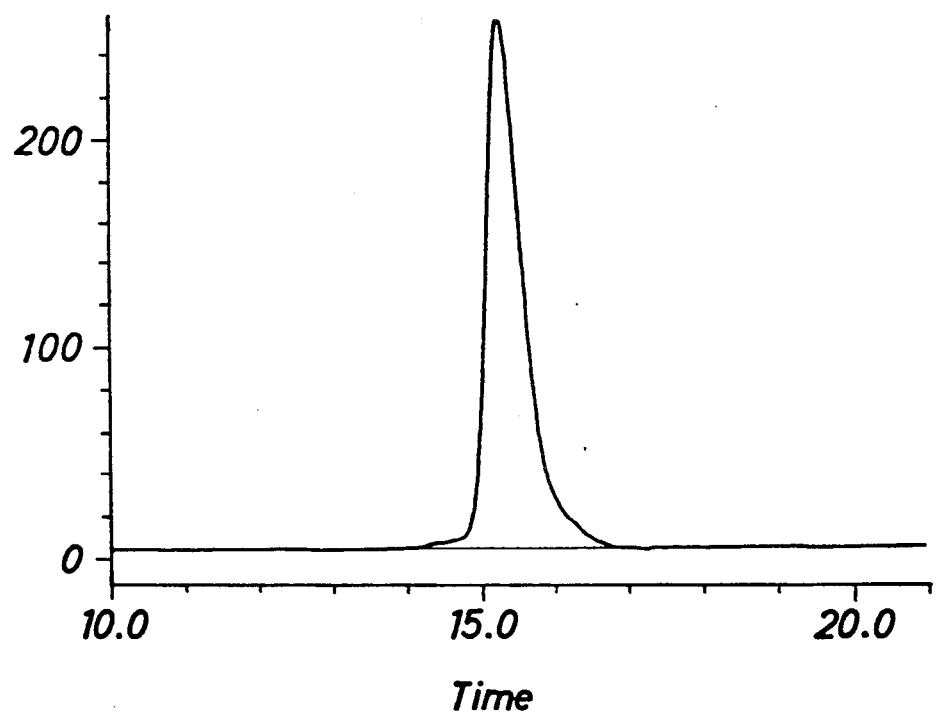
FIG. 1 is a GPC chart of the polymer synthesized in Example 1.

In the above general formula [I], $R^1$ and $R^2$ each represent a hydrocarbon group having 1 to 10 carbon atoms, for example, a lower alkyl group having up to 8 carbon atoms such as a methyl group, an ethyl group, and a propyl group, a cycloalkyl group such as a cyclohexyl group, an alkenyl group such as a vinyl group, an allyl group, and an isopropenoxy group, an aryl group such as a phenyl group, a tolyl group, and a naphthyl group, and an aralkyl group such as a benzyl group and a 2-phenylethyl group. $R^1$ and $R^2$ may be the same or different. The most preferable group in the present invention is a lower alkyl group, particularly a methyl group.

$R^3$ and $R^4$ each represent a hydrocarbon group having 1 to 10 carbon atoms or a perfluoroalkylethyl group. The hydrocarbon group includes those exemplified for $R^1$ and $R^2$ and, among them, a preferable hydrocarbon group is a lower alkyl group having up to 8 carbon atoms and the most preferable hydrocarbon group is a methyl group. The perfluoroalkylethyl group includes, e.g., groups represented by the following formula:

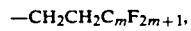

wherein m is a positive integer, and among them, those having up to 12 carbon atoms (i.e., m is up to 10) such as $CF_3CH_2CH_2-$, $(CF_3)_2CFCH_2CH_2-$, $C_4F_9CH_2CH_2-$, $C_6F_{13}CH_2CH_2-$, $C_8F_{17}CH_2CH_2-$, and $C_{10}F_{21}CH_2CH_2-$ are preferable.

In the general formula [I], n is an integer of 10 to 1,000, and due to such a value of n the present polysilethylenesiloxane has a viscosity at 25° C. in the range of 25 to 500,000 cSt, preferably 1,000 to 100,000 cSt.

Preparation

Although the present polysilethylenesiloxane can be synthesized in various manners, typically it can be synthesized by the ring opening polymerization of a 5-membered cyclic silethylenesiloxane represented by the following general formula [III]:

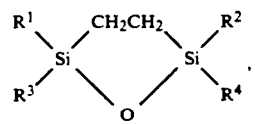

wherein $R^1$ to $R^4$ have the meanings defined above, obtained by hydrolyzing a dichlorosilane represented by the following general formula [II]:

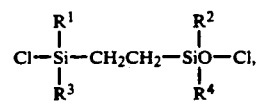

wherein $R^1$ to $R^4$ have the meanings defined above.

The ring open polymerization is generally carried out by heating in the presence of a polymerization catalyst. Where at least one of $R^3$ and $R^4$ is a perfluoroalkylethyl group, the heating temperature is suitably 10° to 200° C., while where neither of $R^3$ and $R^4$ is a perfluoroalkylethyl group, the heating temperature is suitably 50° to 150° C. As a polymerization catalyst, a hydroxide and a silanolate of an alkali metal such as lithium, potassium, and sodium is suitably used and also an acid catalyst, an alkali catalyst, and the like used in the conventional ring open polymerization of dimethylpolysiloxanes may be used. It is preferable that such a polymerization catalyst is used generally in an amount of 0.001 to 1 part by weight per 100 parts by weight of the 5-membered cyclic silethylenesiloxane although the amount varies depending on the type of the polymerization catalyst.

The present polysilethylenesiloxane prepared in this way is a liquid polymer quite useful as a major component of an elastomer composition excellent in properties such as chemical resistance, water repellency, and electrical properties and high in strength and elongation. For example, by curing the polysilethylenesiloxane by the crosslinking reaction applied to common silicone compounds, a rubber cured product having the above properties can be obtained. Particularly, the polysilethylenesiloxane having a perfluoroalkylethyl group in the molecule can provide a rubber cured product low in swelling in organic solvents and machine oils and improved in releasability, water repellency, and oil repellency.

The present polysilethylenesiloxane is expected to be used as a raw material for coating materials or rubber materials which are highly functional.

EXAMPLES

Example 1

100 g (0.625 mol) of a cyclic siloxane represented by the following formula:

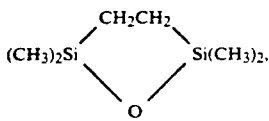

10 g of acetonitrile, and 37.5 mg ($2.08 \times 10^{-3}$ mol) of pure water were charged into a 300-ml four-necked flask equipped with a condenser, agitating blades, and a thermometer and were heated to 95° C. with stirring.

Then tetragryme in an amount of 0.1 g and a potassium silanolate in such an amount that the Si/K ratio (atomic ratio) might be 4,000 were added to the mixture liquid. 5 min after the addition, the mixture liberated heat and the internal temperature rose to 105° C. Then, after the maturing was effected for 3 hours with the bath temperature being kept at 100° C., 1 g of tetrachloroethane as a neutralization agent was added, followed by further maturing for 1 hour at 100° C.

Then the reaction mixture was cooled to room temperature, 0.5 g of activated carbon was added, and after the mixture was stirred for 1 hour, 50 g of toluene was added to dissolve the produced polymer. The solution was filtered under pressure and the filtrate was stripped by an evaporator at 100° C. for 2 hours under a pressure of 3 mmHg to obtain 91.2 g of an oil.

The oil had a viscosity of 4,500 cSt at 25° C. With respect to this oil, the GPC analysis, the OH-group quantitative analysis, the infrared absorption spectral analysis, and the analysis by $^1$H-NMR were carried out and the following results were obtained.

GPC:
Measuring equipment: HLC-8020 manufactured by Tosoh K.K.
Measuring conditions:
Column: G2500+G4000 (one each)
Solvent: Fron-113
Flow rate: 1 ml/min
Detector: differential refractometer
Temperature: 35° C.

The chart is shown in FIG. 1.

As apparent from the chart, a monodisperse pattern was indicated.

OH-group quantitative analysis:
0.04 mol/100 g $^1$H-NMR: in CCl$_4$, the internal standard being CHCl$_3$; δ (ppm); 0.16 (s, Si-CH$_3$, 12H); 0.51 (s, Si-CH$_2$, 4H).

Figure 2:
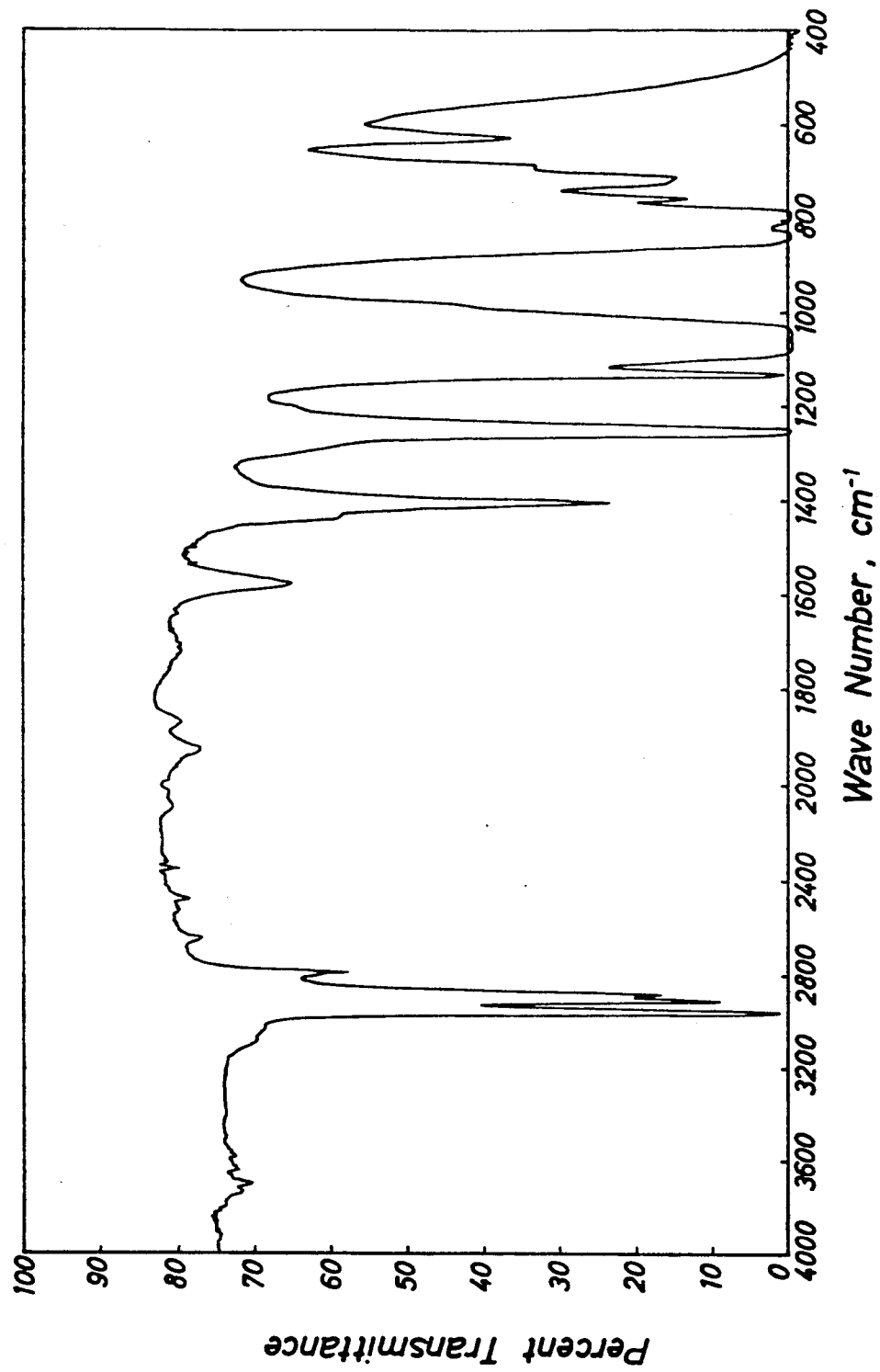
FIG. 2 is a diagram showing the infrared absorption spectrum of the polymer synthesized in Example 1.

Infrared absorption spectrum:
The chart is shown in FIG. 2.
Si-O: 1060 cm$^{-1}$
Si-CH$_3$: 1255 cm$^{-1}$ From the above results, the oil was identified as a polymer having the following formula:

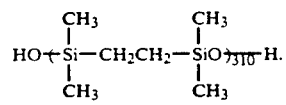

EXAMPLE 2

97.2 g (0.3 mol) of a cyclic siloxane having the following formula:

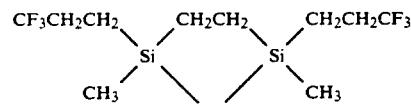

10 g of acetonitrile, and 54 mg (0.003 mol) of pure water were charged into a 300-ml four-necked flask equipped with a condenser, agitating blades, and a thermometer and were heated to 90° C. with stirring.

Then a potassium silanolate in such an amount that the Si/K ratio (atomic ratio) might be 5,000 was added to the mixture liquid. 5 min after the addition, the mixture liberated heat and the internal temperature rose to 105° C. to cause violent reflux of the acetonitrile and thereafter the viscosity rose gradually. Then after maturing was effected for 3 hours at 90° C., 1 g of tetrachloroethane as a neutralization agent was added and further maturing was effected for 3 hours at 90° C.

Then the reaction mixture was cooled to room temperature and was filtered under pressure and the filtrate was stripped by an evaporator at 100° C. for 2 hours under a pressure of 3 mmHg to obtain 91 g of an oil.

The GPC analysis of the oil indicated a monodisperse pattern. The OH-group quantitative analysis, the infrared absorption spectral analysis, and the analysis by $^1$H-NMR and $^{19}$F-NMR were carried out and the following results were obtained.

OH-group quantitative analysis:
$3.01 \times 10^{-5}$ mol/g $^1$H-NMR: in CCl$_4$, the internal standard being CHCl$_3$; δ (ppm); 0.07 (s, Si-CH$_3$, 6H); 0.43 (s, Si-CH$_2$CH$_2$-Si, 4H); 0.81 (t, Si-CH$_2$, 4H); 2.02 (t, CF$_3$-CH$_2$, 4H).

Figure 3:
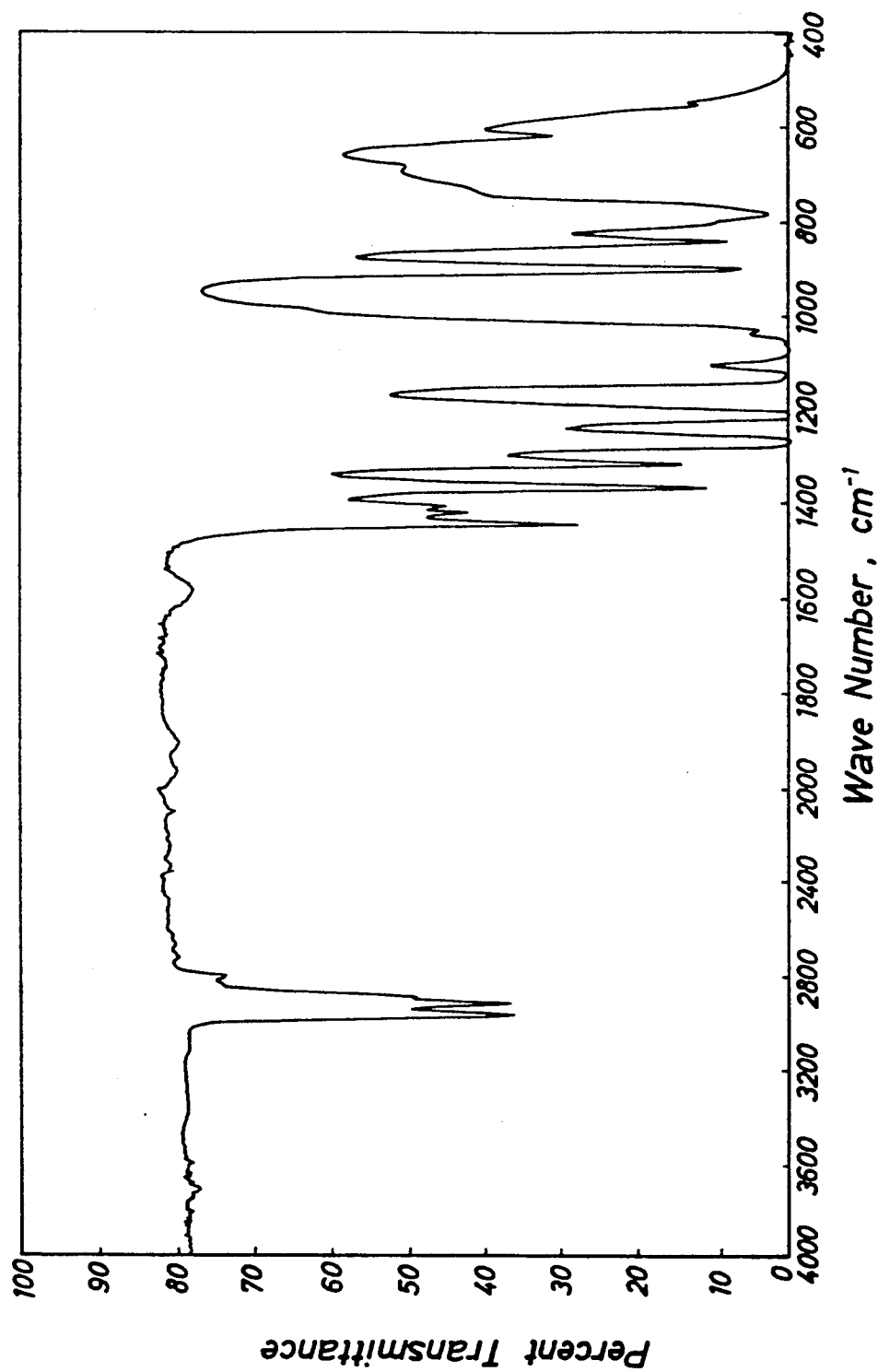
FIG. 3 is a diagram showing the infrared absorption spectrum of the polymer synthesized in Example 2.

Infrared absorption spectrum:
The chart is shown in FIG. 3.
C-F: 1,000 to 1,100 cm$^{-1}$
$^{19}$F-NMR: CF$_3$COOH being the standard.

8.82 ppm CF$_3$-CH$_2$

From the above results, the oil was identified as a polymer having the following formula:

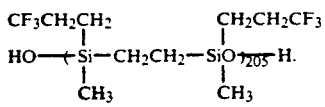

EXAMPLE 3

124.8 g (0.2 mol) of a cyclic siloxane having the following formula:

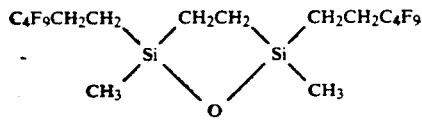

12 g of acetonitrile, and 28.8 mg (0.016 mol) of pure water were charged into a 1-l four-necked flask equipped with a condenser, agitating blades, and a thermometer and were heated to 90° C. with stirring.

Then a lithium silanolate in such an amount that the Si/Li ratio (atomic ratio) might be 4,000 was added to the mixture liquid and the procedure in Example 2 was followed to obtain 116 g of a viscous oil.

With respect to this oil, the GPC analysis, the OH-group quantitative analysis, the infrared absorption spectral analysis, and the analysis by $^1$H-NMR and $^{19}$F-NMR were carried out and the following results were obtained.

Figure 4:
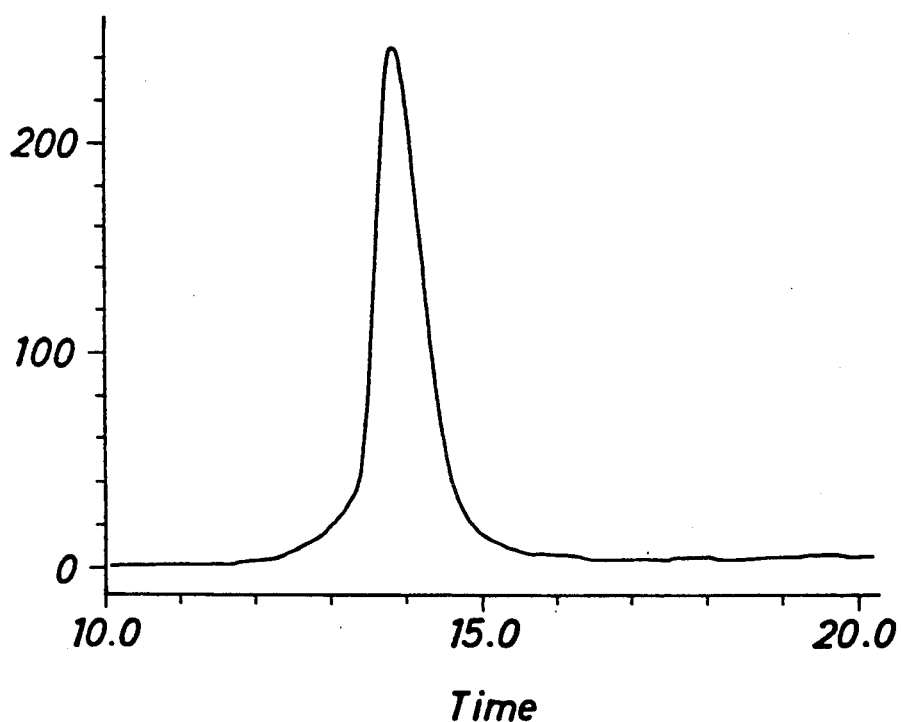
FIG. 4 is a GPC chart of the polymer synthesized in Example 3.

GPC:
Measuring equipment: HLC-8020 manufactured by Tosoh K.K.
Measuring conditions:
  Column: G2500+G4000 (one each)
  Solvent: Fron-113
  Flow rate: 1 ml/min
  Detector differential refractometer
  Temperature: 35° C.
The chart is shown in FIG. 4.

As apparent from the chart, a monodisperse pattern was indicated.

OH-group quantitative analysis:
1.25×10$^{-5}$ mol/g $^1$H-NMR: in CCl$_4$, the internal standard being CHCl$_3$: δ (ppm); 0.23 (s, Si-CH$_3$, 6H); 0.61 (s, Si-CH$_2$-CH$_2$-Si, 4H); 0.91 (t, Si-CH$_2$, 4H); 2.12 (t, CF$_2$-CH$_2$, 4H).

Figure 5:
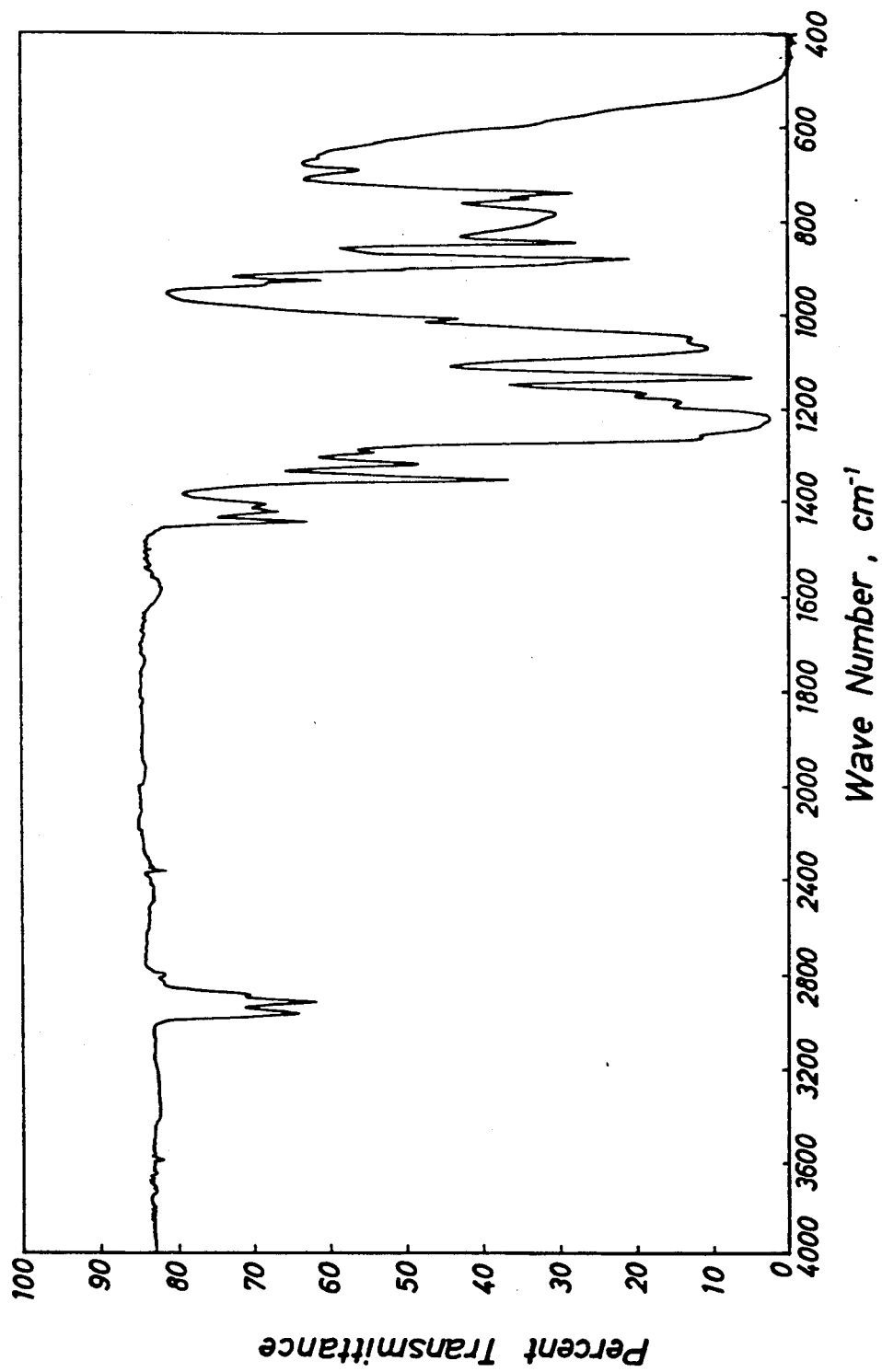
FIG. 5 is a diagram showing the infrared absorption spectrum of the polymer synthesized in Example 3.

Infrared absorption spectrum:
The chart is shown in FIG. 5.
C-F: 1,000 to 1,100 cm$^{-1}$ $^{19}$F-NMR: CF$_3$COOH was the internal standard.

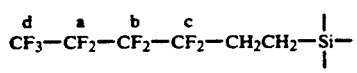

a: −49.56 ppm
b: −47.80 ppm
c: −39.70 ppm
d: −5.37 ppm

From the above results, the oil was identified as a polymer having the following formula:

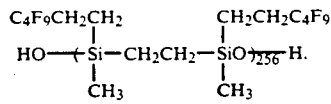

EXAMPLE 4

72.6 g (0.3 mol) of a cyclic siloxane represented by the following formula:

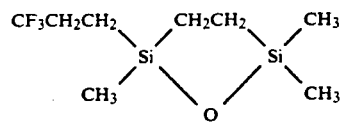

5 g of acetonitrile, and 54 mg (0.003 mol) of pure water were charged into a 300-ml four-necked flask equipped with a condenser, agitating blades, and a thermometer and were heated to 90° C. with stirring.

Then a potassium silanolate in such an amount that the Si/K ratio (atomic ratio) might be 5,000 was added to the mixture liquid. 3 min after the addition, the mixture liberated heat and the internal temperature rose to 110° C. to cause violent reflux of the acetonitrile and thereafter the viscosity rose gradually. Then, after maturing was effected for 3 hours at 90° C., 1 g of tetrachloroethane as a neutralization agent was added, followed by further maturing for 3 hours at 90° C.

Then the reaction mixture was cooled to room temperature and was filtered under pressure and the filtrate was stripped by an evaporator at 100° C. for 2 hours under a pressure of 3 mmHg to obtain 68 g of an oil.

With respect to this oil, the GPC analysis, the OH-group quantitative analysis, and the analysis by $^1$H-NMR and $^{19}$F-NMR were carried out and the following results were obtained.

Figure 6:
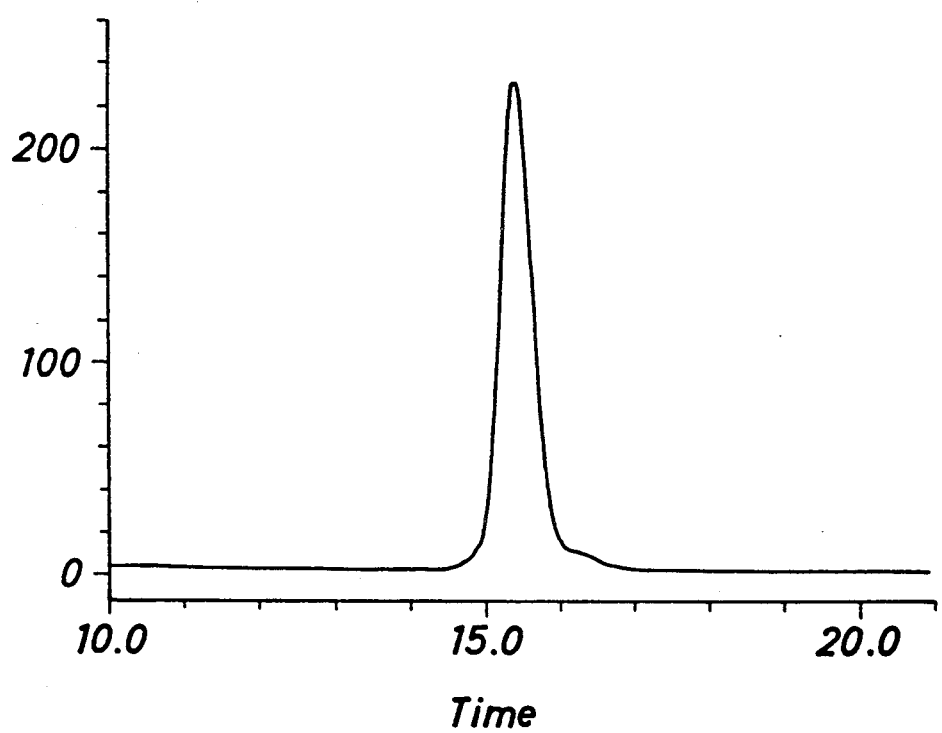
FIG. 6 is a GPC chart of the polymer synthesized in Example 4.

GPC:
Measuring equipment: HLC-8020 manufactured by Tosoh K.K.
Measuring conditions:
  Column: G2500+G4000 (one each)
  Solvent: Fron-113
  Flow rate: 1 ml/min
  Detector: differential refractometer
  Temperature: 35° C.
The chart is shown in FIG. 6.

As apparent from the chart, a monodisperse pattern was indicated.

OH-group quantitative analysis:
4.13×10$^{-5}$ mol/g $^1$H-NMR: in CCl$_4$, the standard being CHCl$_3$; δ (ppm); 0.10 (s, Si-CH$_3$, 9H); 0.45 (s, Si-CH$_2$CH$_2$-Si, 4H); 0.80 (t, Si-CH$_2$, 2H); 2.11 (t, CF$_3$-CH$_2$, 2H).

$^{19}$F-NMR: CF$_3$COOH being the internal standard.
8.81 ppm CF$_3$-CH$_2$

From the above results, the oil was identified as a polymer having the following formula:

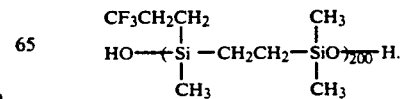

EXAMPLE 5

118.4 g (0.2 mol) of a cyclic siloxane having the following formula:

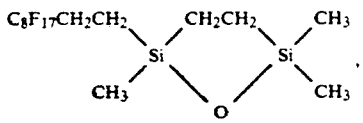

10 g of acetonitrile, and 36 mg (0.002 mol) of pure water were charged into a 300-ml four-necked flask equipped with a condenser, agitating blades, and a thermometer and were heated to 90° C. with stirring.

Then a lithium silanolate in such an amount that the Si/Li ratio (atomic ratio) might be 4,000 was added to the mixture liquid and the procedure in Example 4 was followed to obtain 108 g of a viscous oil.

With respect to this oil, the GPC analysis, the OH-group quantitative analysis, the infrared absorption spectral analysis, and the analysis by $^1$H-NMR and $^{19}$F-NMR were carried out and the following results were obtained.

GPC:
Measuring equipment: HLC-8020 manufactured by Tosoh K.K.
Measuring conditions:
Column: G2500+G4000 (one each)
Solvent: Fron-113
Flow rate: 1 ml/min
Detector: differential refractometer
Temperature: 35° C.

Figure 7:
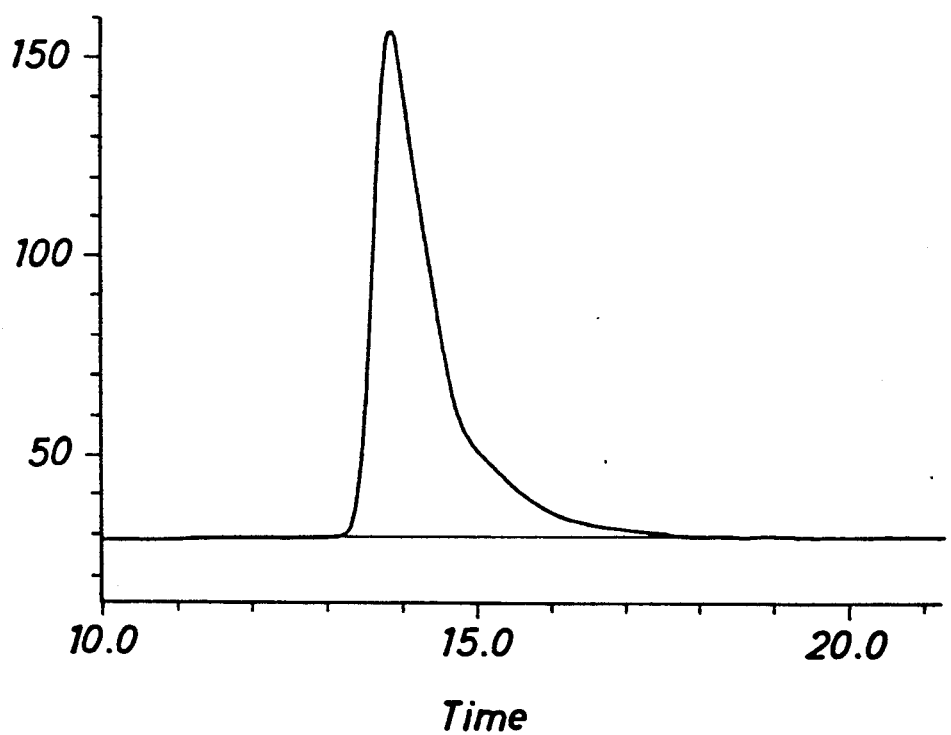
FIG. 7 is a GPC chart of the polymer synthesized in Example 5.

The chart is shown in FIG. 7.

As apparent from the chart, a monodisperse pattern was indicated.

OH-group quantitative analysis:
$1.10 \times 10^{-5}$ mol/g $^1$H-NMR: in CCl$_4$, the internal standard being CHCl$_3$; δ (ppm); 0.22 (s, Si-CH$_2$, 9H); 0.63 (s, Si-CH$_2$-CH$_2$-Si, 4H); 0.88 (t, Si-CH$_2$, 2H); 2.12 (t, CF$_2$-CH$_2$, 2H).

Figure 8:
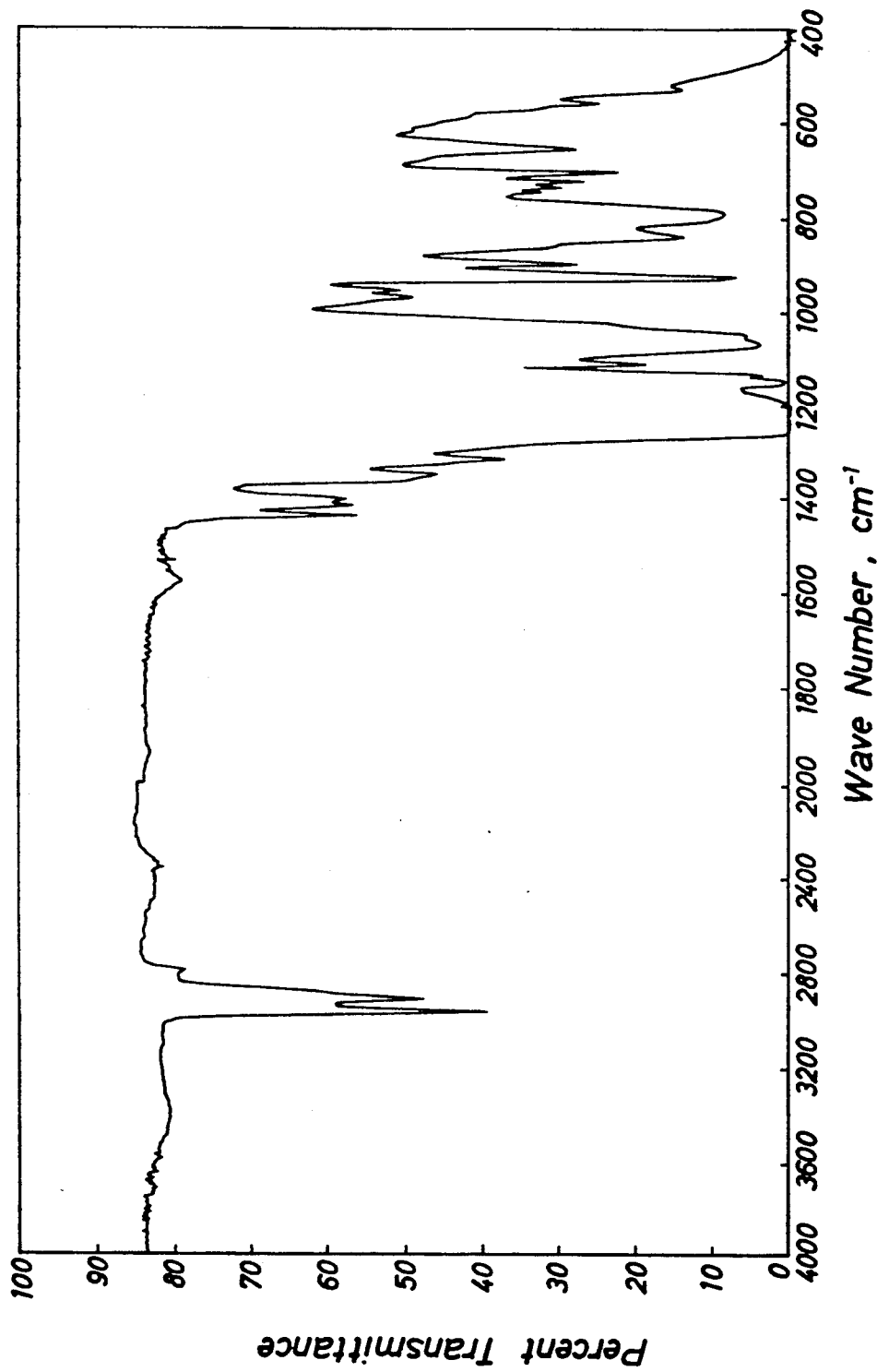
FIG. 8 is a diagram showing the infrared absorption spectrum of the polymer synthesized in Example 5.

Infrared absorption spectrum:
The chart is shown in FIG. 8.
C-F: 1,130 to 1,260 cm$^{-1}$ $^{19}$F-NMR: CF$_3$COOH was the internal standard.

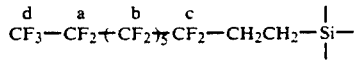

a: $-49.42$ ppm
b: $-47.77$ ppm
c: $-39.87$ ppm
d: $-5.32$ ppm

From the above results, the oil was identified as a polymer having the following formula:

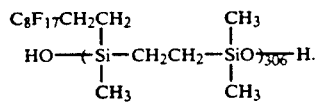

We claim:

1. A polysilethylenesiloxane represented by the following general formula I:

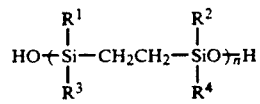

wherein R$^1$ and R$^2$, which may be the same or different, each represent a hydrocarbon group having 1 to 10 carbon atoms, R$^3$ and R$^4$, which may be the same or different, each represent a hydrocarbon group having 1 to 10 carbon atoms or a perfluoroalkylethyl group, and n is an integer of 10 to 1,000, wherein, in said general formula I, at least one of R$^3$ and R$^4$ represents a perfluoroalkylethyl group.

2. A polysilethylenesiloxane as claimed in claim 1, wherein, in said general formula I, R$^3$ and R$^4$ each represent a perfluoroalkylethyl group.

3. A polysilethylenesiloxane as claimed in claim 1, wherein said perfluoroalkylethyl group has up to 12 carbon atoms.

4. A polysilethylenesiloxane as claimed in claim 3, wherein said perfluoroalkylethyl group is selected from the group consisting of CF$_3$CH$_2$CH$_2$—, (CF$_3$)$_2$CFCH$_2$CH$_2$—, C$_4$F$_9$CH$_2$CH$_2$—, C$_6$F$_{13}$CH$_2$CH$_2$—, C$_8$F$_{17}$CH$_2$CH$_2$—, and C$_{10}$F$_{21}$CH$_2$CH$_2$—.

5. A polysilethylenesiloxane as claimed in claim 2, wherein said perfluoroalkylethyl group has up to 12 carbon atoms.

6. A polysilethylenesiloxane as claimed in claim 5, wherein said perfluoroalkylethyl group is selected from the group consisting of CF$_3$CH$_2$CH$_2$—, (CF$_3$)$_2$CFCH$_2$CH$_2$—, C$_4$F$_9$CH$_2$CH$_2$—, C$_6$F$_{13}$CH$_2$CH$_2$—, C$_8$F$_{17}$CH$_2$CH$_2$—, and C$_{10}$F$_{21}$CH$_2$CH$_2$—.

* * * * *